United States Patent
Suzuki et al.

(10) Patent No.: US 10,300,846 B2
(45) Date of Patent: *May 28, 2019

(54) IMAGE DISPLAY APPARATUS

(71) Applicant: SUBARU CORPORATION, Tokyo (JP)

(72) Inventors: Dan Suzuki, Tokyo (JP); Makoto Kinoshita, Tokyo (JP); Toru Yamazumi, Tokyo (JP); Kentarou Yamasaki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/888,858

(22) Filed: Feb. 5, 2018

(65) Prior Publication Data
US 2018/0257548 A1 Sep. 13, 2018

(30) Foreign Application Priority Data

Mar. 10, 2017 (JP) .................. 2017-046049

(51) Int. Cl.
*B60Q 1/04* (2006.01)
*B60Q 1/50* (2006.01)
*B60Q 1/52* (2006.01)

(52) U.S. Cl.
CPC .............. *B60Q 1/50* (2013.01); *B60Q 1/04* (2013.01); *B60Q 1/525* (2013.01); *B60Q 2400/50* (2013.01)

(58) Field of Classification Search
None
See application file for complete search history.

(56) References Cited

U.S. PATENT DOCUMENTS

| 5,654,705 A * | 8/1997 | Houten .................. G08G 1/095 |
| | | 116/63 R |
| 6,662,108 B2 | 12/2003 | Miller et al. |
| 8,269,652 B2 | 9/2012 | Seder et al. |

(Continued)

FOREIGN PATENT DOCUMENTS

| EP | 2233356 A1 * | 9/2010 | ............. B60Q 1/085 |
| JP | H11-263145 A | 9/1999 | |

(Continued)

OTHER PUBLICATIONS

Japanese Office Action issue in corresponding Japanese Patent Application No. 2017-046452, dated Aug. 21, 2018, with English Translation.

(Continued)

*Primary Examiner* — Steven Lim
*Assistant Examiner* — Muhammad Adnan
(74) *Attorney, Agent, or Firm* — McDermott Will & Emery LLP

(57) ABSTRACT

An image display device includes an illuminator and a detector. The illuminator is configured to send out light on a road surface frontward of a vehicle, to display an image on the road surface. The detector is configured to detect a pedestrian frontward of the vehicle. The illuminator is configured to cause a notification image to be on chronologically-changeable display on the road surface. The notification image notifies information to the pedestrian detected by the detector.

11 Claims, 7 Drawing Sheets

(56) References Cited

U.S. PATENT DOCUMENTS

| | | |
|---|---|---|
| 8,954,252 B1 | 2/2015 | Urmson et al. |
| 8,996,224 B1 | 3/2015 | Herbach et al. |
| 9,135,754 B2 | 9/2015 | Ng-Thow-Hing et al. |
| 9,475,422 B2 | 10/2016 | Hillis et al. |
| 9,558,409 B2 | 1/2017 | Pliefke et al. |
| 9,575,176 B2 | 2/2017 | Baba |
| 9,654,738 B1 | 5/2017 | Ferguson et al. |
| 9,849,784 B1 | 12/2017 | Chan et al. |
| 9,896,107 B1 | 2/2018 | Huang |
| 9,902,311 B2 | 2/2018 | Sweeney et al. |
| 9,905,132 B2 | 2/2018 | Habu |
| 9,925,989 B2 | 3/2018 | Lee |
| 9,947,221 B1 | 4/2018 | Mazzola |
| 9,952,054 B2 | 4/2018 | An et al. |
| 9,969,326 B2 | 5/2018 | Ross et al. |
| 9,978,280 B2 | 5/2018 | Lee et al. |
| 9,988,047 B2 | 6/2018 | Johnson et al. |
| 10,048,688 B2 | 8/2018 | Ramasamy |
| 10,089,537 B2 | 10/2018 | Nix et al. |
| 2002/0140555 A1 | 10/2002 | Jette et al. |
| 2005/0278098 A1 | 12/2005 | Breed |
| 2006/0055525 A1 | 3/2006 | Kubota et al. |
| 2007/0067081 A1* | 3/2007 | Ton .................. B60Q 9/008 701/41 |
| 2008/0040004 A1 | 2/2008 | Breed |
| 2008/0175012 A1 | 7/2008 | Shimaoka et al. |
| 2008/0243389 A1 | 10/2008 | Inoue et al. |
| 2008/0312832 A1 | 12/2008 | Greene et al. |
| 2008/0312833 A1 | 12/2008 | Greene et al. |
| 2009/0160678 A1 | 6/2009 | Turnbull |
| 2010/0030474 A1 | 2/2010 | Sawada |
| 2010/0082251 A1 | 4/2010 | Kogure |
| 2011/0128139 A1 | 6/2011 | Tauchi et al. |
| 2011/0184617 A1 | 7/2011 | Hegemann et al. |
| 2012/0140988 A1 | 6/2012 | Takahashi |
| 2012/0194356 A1* | 8/2012 | Haines .................. G08G 1/161 340/933 |
| 2012/0224060 A1 | 9/2012 | Gurevich et al. |
| 2013/0057690 A1 | 3/2013 | Mitsugi |
| 2014/0062685 A1* | 3/2014 | Tamatsu .............. B60Q 5/005 340/425.5 |
| 2014/0152488 A1 | 6/2014 | Baba |
| 2015/0103174 A1 | 4/2015 | Emura et al. |
| 2015/0179073 A1 | 6/2015 | Suzuno |
| 2015/0194082 A1* | 7/2015 | McEwan ............. G09F 21/048 40/209 |
| 2015/0334269 A1 | 11/2015 | Yokota et al. |
| 2016/0039286 A1 | 2/2016 | Shibata et al. |
| 2016/0093207 A1 | 3/2016 | Di Censo et al. |
| 2016/0115650 A1 | 4/2016 | Leung |
| 2016/0247393 A1 | 8/2016 | Okamoto et al. |
| 2016/0332568 A1 | 11/2016 | Kim |
| 2017/0043705 A1 | 2/2017 | Mizuno |
| 2017/0140651 A1* | 5/2017 | Lee .................. G08G 1/166 |
| 2017/0182934 A1 | 6/2017 | Arita et al. |
| 2017/0210283 A1 | 7/2017 | Ishida |
| 2017/0217361 A1 | 8/2017 | Miller |
| 2017/0217368 A1 | 8/2017 | Lewis et al. |
| 2017/0217422 A1 | 8/2017 | Nakamura |
| 2017/0240096 A1 | 8/2017 | Ross et al. |
| 2017/0253177 A1 | 9/2017 | Kawamata et al. |
| 2017/0253181 A1 | 9/2017 | Choi et al. |
| 2017/0259734 A1 | 9/2017 | Imaishi et al. |
| 2017/0276308 A1 | 9/2017 | Nakazawa et al. |
| 2017/0330463 A1 | 11/2017 | Li et al. |
| 2017/0337821 A1* | 11/2017 | Masuda .................. G08G 1/166 |
| 2017/0372613 A1 | 12/2017 | Habu |
| 2018/0009374 A1 | 1/2018 | Kim et al. |
| 2018/0024562 A1 | 1/2018 | Bellaiche |
| 2018/0025235 A1 | 1/2018 | Fridman |
| 2018/0033306 A1 | 2/2018 | Kim et al. |
| 2018/0086346 A1 | 3/2018 | Fujisawa et al. |
| 2018/0118099 A1 | 5/2018 | Kunii et al. |
| 2018/0118106 A1 | 5/2018 | You et al. |
| 2018/0134286 A1 | 5/2018 | Yi et al. |
| 2018/0141484 A1 | 5/2018 | Haneda et al. |
| 2018/0173234 A1 | 6/2018 | Van Laack et al. |
| 2018/0173237 A1 | 6/2018 | Reiley et al. |
| 2018/0218601 A1 | 8/2018 | Aoki et al. |
| 2018/0247540 A1 | 8/2018 | Hagawa et al. |
| 2018/0250596 A1 | 9/2018 | Kim |
| 2018/0253609 A1 | 9/2018 | Potter et al. |
| 2018/0257547 A1 | 9/2018 | Suzuki et al. |
| 2018/0257549 A1 | 9/2018 | Suzuki et al. |
| 2018/0257550 A1 | 9/2018 | Suzuki et al. |
| 2018/0261080 A1 | 9/2018 | Suzuki et al. |
| 2018/0261081 A1 | 9/2018 | Suzuki et al. |

FOREIGN PATENT DOCUMENTS

| | | |
|---|---|---|
| JP | 2006-252264 A | 9/2006 |
| JP | 2008-007079 A | 1/2008 |
| JP | 2008-143510 A | 6/2008 |
| JP | 2009-149152 A | 7/2009 |
| JP | 2009-230701 A | 10/2009 |
| JP | 4720650 B2 | 7/2011 |
| JP | 2013-203251 A | 10/2013 |
| JP | 2014-189198 A | 10/2014 |
| JP | 2015-205572 A | 11/2015 |
| JP | 2016-020876 A | 2/2016 |
| JP | 2016-107777 A | 6/2016 |
| JP | 2017-001501 A | 1/2017 |
| JP | 2017-007502 A | 1/2017 |
| JP | 2017-049885 A | 3/2017 |
| JP | 2017-159699 A | 9/2017 |
| WO | 2016/024316 A1 | 2/2016 |
| WO | 2016/039288 A1 | 3/2016 |
| WO | 2016/163294 A1 | 10/2016 |

OTHER PUBLICATIONS

Japanese Decision to Grant a Patent issued in corresponding Japanese Patent Application No. 2017-046045, dated Oct. 2, 2018, with English Translation.
Japanese Office Action dated Jul. 24, 2018, with English translation, issued in corresponding Japanese Patent Application No. 2017-046047.
Japanese Office Action dated Aug. 7, 2018, with English translation, issued in corresponding Japanese Patent Application No. 2017-046050.
Japanese Office Action dated Sep. 11, 2018, with English translation, issued in corresponding Japanese Patent Application No. 2017-046052.
Japanese Office Action, dated Jul. 24, 2018, with English Translation, issued in related Japanese Patent Application No. 2017-046045.
Non-Final Office Action dated Oct. 17, 2018, issued in related U.S. Appl. No. 15/877,859.
Non-Final Office Action dated Jul. 11, 2018, issued in related U.S. Appl. No. 15/890,963.
Non-Final Office Action dated Oct. 25, 2018, issued in related U.S. Appl. No. 15/888,791.
Non-Final Office Action dated Jun. 4, 2018, issued in related U.S. Appl. No. 15/877,901.
Final Office Action dated Oct. 30, 2018, issued in related U.S. Appl. No. 15/877,901.
Non-Final Office Action, dated Jan. 2, 2019, issued in related U.S. Appl. No. 15/890,918.
Japanese Office Action issued in corresponding Japanese Patent Application No. 2017-046049, dated Aug. 7, 2018, with English Translation.
Notice of Allowance issued in related U.S. Appl. No. 15/888,791, dated Mar. 15, 2019.
Notice of Allowance issued in related U.S. Appl. No. 15/877,901, dated Feb. 20, 2019.
Notice of Allowance issued in related U.S. Appl. No. 15/890,963, dated Dec. 19, 2018.

* cited by examiner

| SAFETY LEVEL | PEDESTRIAN POSITION | | PEDESTRIAN DIRECTION | |
|---|---|---|---|---|
| | POSITION WITH RESPECT TO VEHICLE | POSITION WITH RESPECT TO DRIVEWAY | DIRECTION WITH RESPECT TO VEHICLE | DIRECTION WITH RESPECT TO DRIVEWAY |
| HIGHER ↓ LOWER | FARTHER ↓ CLOSER | FARTHER ↓ CLOSER | RECEDING DIRECTION ↓ APPROACHING DIRECTION | RECEDING DIRECTION ↓ APPROACHING DIRECTION |

FIG. 3

IMAGE DISPLAY APPARATUS

CROSS-REFERENCE TO RELATED APPLICATIONS

The present application claims priority from Japanese Patent Application No. 2017-046049 filed on Mar. 10, 2017, the entire contents of which are hereby incorporated by reference.

BACKGROUND

The technology relates to an image display device that displays an image on a road surface.

A device has been known that depicts figures or other geometrical shapes on a road surface, by a light-distribution control of headlights or other lights of a vehicle.

For example, Japanese Unexamined Patent Application Publication (JP-A) No. 2009-149152 describes a light drive unit that controls a light-distribution control unit of lights, to indicate a direction of a person who is estimated to be in danger, and a distance to the person, by a low-luminance region. The low-luminance region is a part whose luminance is lowered, out of a region of the road surface illuminated with light.

SUMMARY

Regarding an image display device that displays an image on a road surface, there is a request for ability to notify a pedestrian of a safety level of a vehicle.

It is desirable to provide an image display device that makes it possible to notify a pedestrian of a safety level of a vehicle.

An aspect of the technology provides an image display device including an illuminator and a detector. The illuminator is configured to send out light on a road surface frontward of a vehicle, to display an image on the road surface. The detector is configured to detect a pedestrian frontward of the vehicle. The illuminator is configured to cause a notification image to be on chronologically-changeable display on the road surface. The notification image notifies information to the pedestrian detected by the detector.

An aspect of the technology provides an image display device including an illuminator, a detector, and circuitry. The illuminator is configured to send out light on a road surface frontward of a vehicle, to display an image on the road surface. The detector is configured to detect a pedestrian frontward of the vehicle. The circuitry is configured to control the illuminator to cause a notification image to be on chronologically-changeable display on the road surface. The notification image notifies information to the pedestrian detected by the detector.

BRIEF DESCRIPTION OF THE DRAWINGS

Some implementations of the technology are described below as mere examples with reference to the accompanying drawings.

FIG. 3 summarizes evaluation items to evaluate a safety level of the vehicle with respect to a pedestrian, in the image display device according to the implementation of the technology.

DETAILED DESCRIPTION

Figure 1:
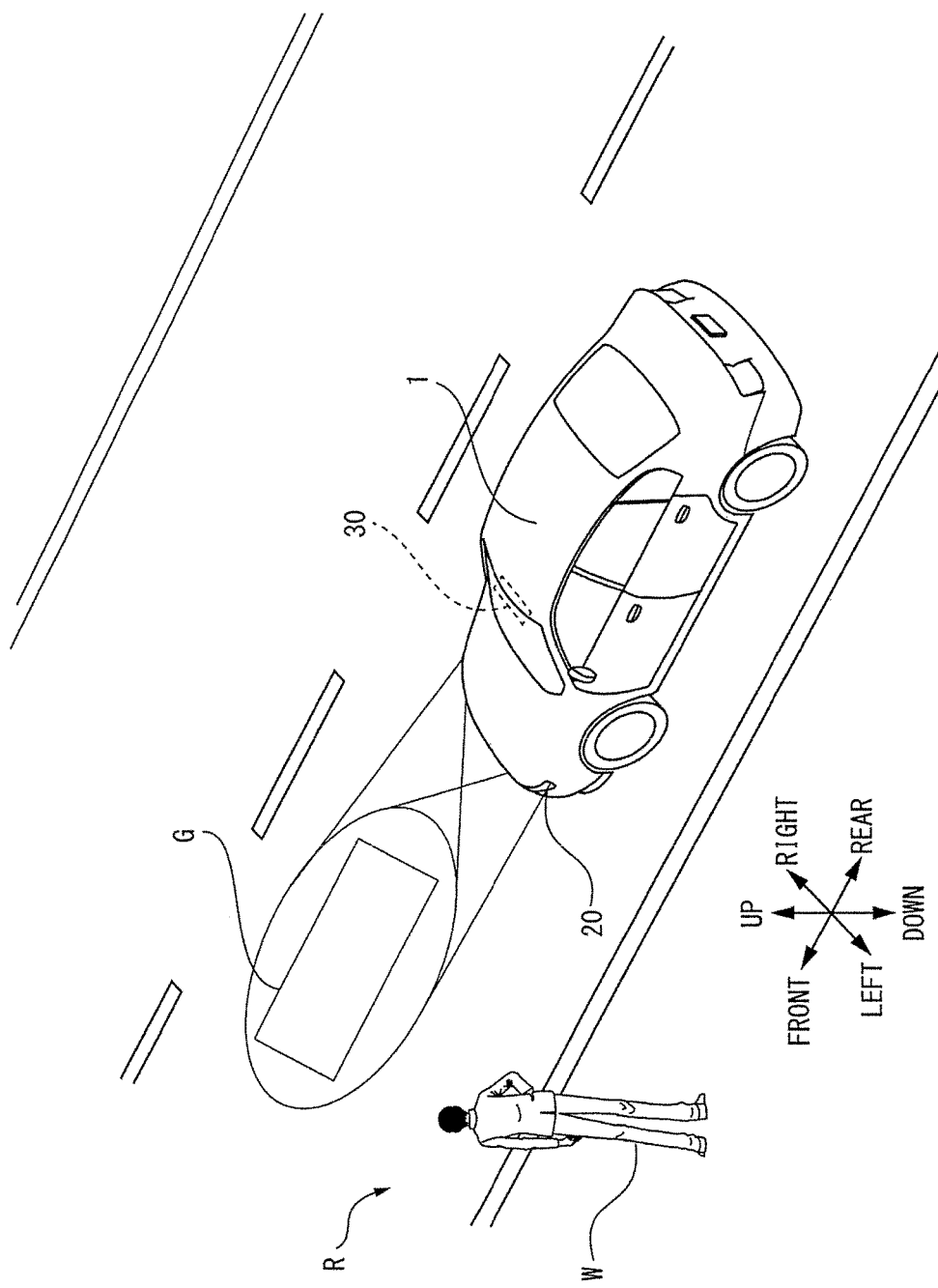
FIG. 1 illustrates an appearance and a configuration of a vehicle including an image display device according to an implementation of the technology.

In the following, some implementations of the technology are described in detail with reference to the drawings. The implementations described below each illustrate one example of the technology, and are not intended to limit the contents of the technology. All of the configurations and the operation described in each implementation are not necessarily essential for configurations and operation of the technology. It is to be noted that like constituent elements are denoted by the same reference characters, and description thereof is omitted to avoid redundancy.

[1. Configuration of Image Display Device]

Figure 2:
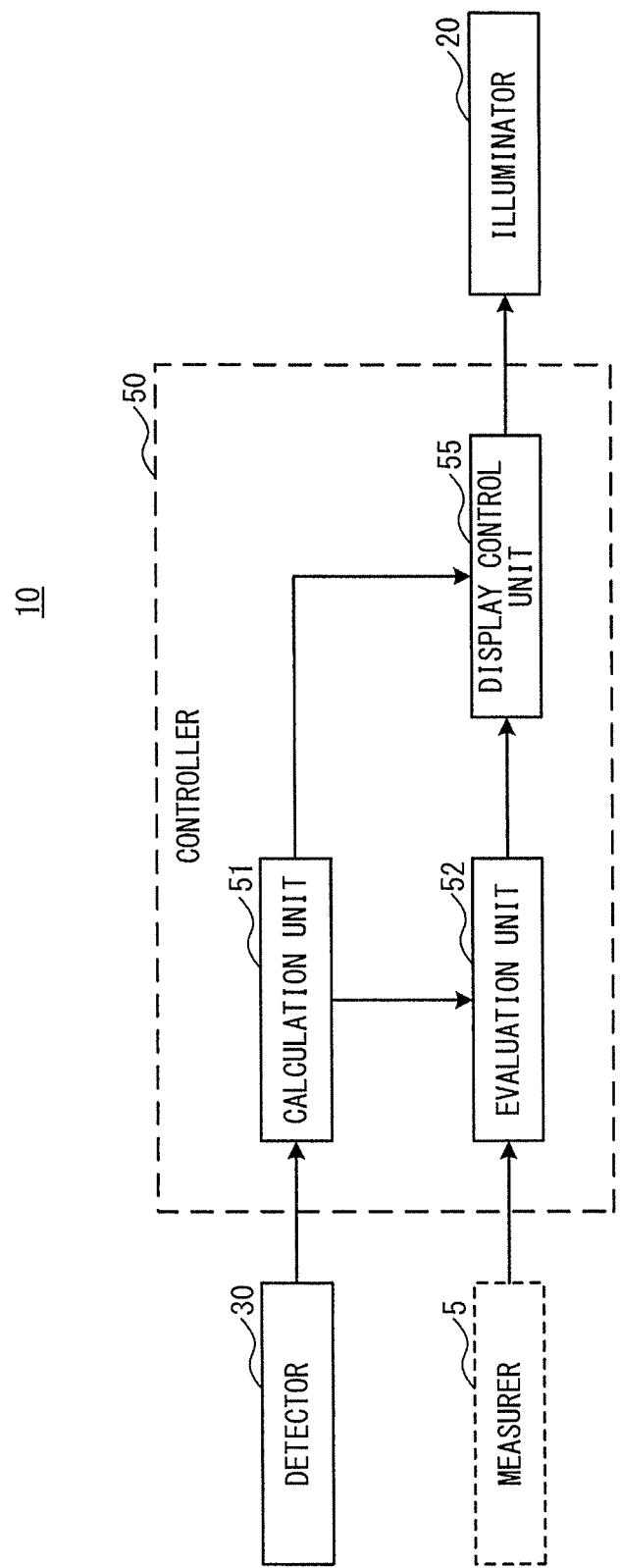
FIG. 2 is a block diagram of a functional configuration of the image display device according to the implementation of the technology.

FIG. 1 illustrates an appearance and a configuration of a vehicle 1 including an image display device 10 according to an implementation of the technology. FIG. 2 is a block diagram of a functional configuration of the image display device 10 according to the implementation of the technology. FIG. 3 summarizes evaluation items to evaluate a safety level of the vehicle 1 with respect to a pedestrian W, in the image display device 10 according to the implementation of the technology.

The image display device 10 may be a device that is mounted on the vehicle 1, and displays an image on a road surface R around the vehicle 1. The image display device 10 may be a device that displays the image on the road surface R, and thereby notifies information to a surrounding entity around the vehicle 1. The term "surrounding entity" means a surrounding vehicle different from the vehicle 1, or a pedestrian. The term "pedestrian" means a person who passes along a sidewalk, and a person who passes along or crosses a driveway, inclusive of a person who rides a bicycle. The image to be displayed on the road surface R by the image display device 10 to notify the information to the surrounding entity around the vehicle 1 is also called a "notification image". Moreover, processing to be performed by the image display device 10 to display the notification image G on the road surface R is also called "image display processing".

In particular, as illustrated in FIGS. 1 and 2, the image display device 10 may be a device that displays the notification image G on the road surface R frontward of the vehicle 1, to notify the information to the pedestrian W frontward of the vehicle 1. The notification image G may be a still image, a moving image, or a combination thereof. The notification image G may be a three-dimensional image such as hologram. It is to be noted that the term "frontward of the vehicle 1" means a direction of an advance of the vehicle 1, as illustrated in FIG. 1.

The image display device 10 may include an illuminator 20, a detector 30, and a controller 50.

The illuminator 20 may be a device that sends out light on the road surface R frontward of the vehicle 1. The image to be displayed on the road surface R by the image display device 10 may be depicted by the light sent out by the illuminator 20. In other words, the illuminator 20 may be able to send out the light on the road surface R frontward of the vehicle 1, to display the image on the road surface R. The illuminator 20 may include various light sources such as a lamp, a light emitting diode (LED), a digital micro mirror device, and a projector. The illuminator 20 may include headlights of the vehicle 1. In one preferred but non-limiting example, the illuminator 20 may include light-distribution-variable headlights such as adaptive driving beam (ADB).

The detector 30 may be a sensor that detects surroundings of the vehicle 1. The detector 30 may include one or more cameras. The detector 30 may include a combination of a camera and, for example, radar. The term "surroundings of the vehicle 1" means road environment of a road on which the vehicle 1 is located. Non-limiting examples of the road environment to be detected by the detector 30 may include roads, pedestrians, vehicles, road markings, road signs, traffic lights, intersections, railway crossings, footbridges, street lamps, buildings, and equipment.

In particular, the detector 30 may be able to detect the pedestrian W frontward of the vehicle 1. In one specific but non-limiting example, the detector 30 may detect, in real time, a pedestrian position of the pedestrian W who crosses the driveway on which the vehicle 1 travels, and a pedestrian direction of the pedestrian W. The detector 30 may supply the controller 50 with information regarding the pedestrian position detected, and with information regarding the pedestrian direction detected. It is to be noted that the pedestrian direction means a direction of movement of the pedestrian W in a case where the pedestrian W is moving. In a case where the pedestrian W is standing still, the pedestrian direction means a direction to which the face of the pedestrian W is turned.

The controller 50 may be a control unit that controls image display on the road surface R by the image display device 10. The controller 50 may be a control unit that controls the illuminator 20 on the basis of the information outputted from the detector 30. The controller 50 may include an electronic control unit (ECU) that synthetically controls constituent elements included in the image display device 10.

The controller 50 may include a calculation unit 51, an evaluation unit 52, and a display control unit 55.

The calculation unit 51 may have a function of calculating a distance from the pedestrian W detected by the detector 30 to the vehicle 1. In one specific but non-limiting example, the calculation unit 51 may calculate a distance from the pedestrian position detected by the detector 30 to a position of the vehicle 1. The calculation unit 51 may supply a calculation result to the evaluation unit 52.

The evaluation unit 52 may have a function of evaluating a safety level of the vehicle 1 with respect to the pedestrian W. In one specific but non-limiting example, the evaluation unit 52 may evaluate the safety level of the vehicle 1 with respect to the pedestrian W, on the basis of the distance from the pedestrian W to the vehicle 1 calculated by the calculation unit 51, and on the basis of a speed of the vehicle 1. The safety level of the vehicle 1 with respect to the pedestrian W may be an index that indicates what degree of safety the vehicle 1 has with respect to the pedestrian W. The speed of the vehicle 1 may be measured by a measurer 5. The measurer 5 may be provided in advance in the vehicle 1, and measure a traveling speed of the vehicle 1. Alternatively, the speed of the vehicle 1 may be measured by analyzing images acquired by the detector 30.

In particular, the evaluation unit 52 may evaluate, as the safety level as mentioned above, arrival time it takes for the vehicle 1 to arrive at the pedestrian position detected by the detector 30. The evaluation unit 52 may be able to estimate the arrival time by dividing the distance from the pedestrian W to the vehicle 1 calculated by the calculation unit 51, by the speed of the vehicle 1 measured. The evaluation unit 52 may supply the display control unit 55 with information regarding the arrival time estimated. Notifying the pedestrian W of the arrival time makes it possible for the pedestrian W to quantitatively recognize the safety level of the vehicle 1 with respect to the pedestrian W. Accordingly, the evaluation of the arrival time as the safety level as mentioned above is effective, in terms of protection of safety of the pedestrian W.

Furthermore, the evaluation unit 52 may evaluate the safety level of the vehicle 1 with respect to the pedestrian W, not only from a viewpoint of the arrival time but also from another viewpoint. In one specific but non-limiting example, the evaluation unit 52 may evaluate the safety level, by focusing not only on the arrival time but also on a state of the pedestrian position and the pedestrian direction.

For example, as illustrated in FIG. 3, the evaluation unit 52 may evaluate the safety level highly, in a case where the pedestrian position detected by the detector 30 is located far away from the vehicle 1. The evaluation unit 52 may evaluate the safety level lowly, in a case where the pedestrian position detected by the detector 30 is close to the vehicle 1. Moreover, the evaluation unit 52 may evaluate the safety level highly, in a case where the pedestrian position detected by the detector 30 is located far away from the driveway on which the vehicle 1 travels. The evaluation unit 52 may evaluate the safety level lowly, in a case where the pedestrian position detected by the detector 30 is close to the driveway. In a case where the pedestrian position is located inside the driveway, the safety level may be evaluated lowly. It is to be noted that positional relation of the pedestrian W to the vehicle 1 may be the evaluation item to be quantitatively evaluated as the arrival time as mentioned above. In other words, the arrival time may be the evaluation item of the safety level regarding the positional relation of the pedestrian W to the vehicle 1.

Moreover, the evaluation unit 52 may evaluate the safety level highly, in a case where the pedestrian direction detected by the detector 30 is a receding direction from the vehicle 1. The evaluation unit 52 may evaluate the safety level lowly, in a case where the pedestrian direction detected by the detector 30 is an approaching direction with respect to the vehicle 1. Furthermore, the evaluation unit 52 may evaluate the safety level highly, in a case where the pedestrian direction detected by the detector 30 is a receding direction from the driveway on which the vehicle 1 travels. The evaluation unit 52 may evaluate the safety level lowly, in a case where the pedestrian direction detected by the detector 30 is an approaching direction with respect to the driveway.

The display control unit 55 may have a function of performing a display control of the notification image G on the road surface R. The display control unit 55 may control the illuminator 20 to cause the notification image G to be on chronologically-changeable display on the road surface R in accordance with a change in the safety level. The notification image G may be notified to the pedestrian W. In one specific but non-limiting example, the display control unit 55 may set, as the notification image G, a count-down image of the arrival time acquired by the evaluation unit 52. The display control unit 55 may control the illuminator 20 to cause the count-down image of the arrival time set as the notification image G to be displayed in a region of the road surface R near the pedestrian W. At this occasion, the display control unit 55 may control the illuminator 20 to cause the notification image G to be on movable display on the road surface R following a change in the pedestrian position and a change in the pedestrian direction detected by the detector 30.

Moreover, the display control unit 55 may control the illuminator 20 to cause the notification image G to be displayed in a display mode corresponding to the safety level evaluated by the evaluation unit 52. In one specific but non-limiting example, in a case with the relatively low safety level, the display control unit 55 may set the display mode of the notification image G, to cause more highlighted display of the notification image G than in a case with the relatively high safety level, in order to attract the pedestrian's attention more easily. In more details, the display control unit 55 may set the display mode of the notification image G, to cause at least one of the following to be carried out in accordance with reduction in the arrival time: enlargement of the notification image G; an increase in luminance of the notification image G; and a color change in the notification image G. It is to be noted that the display mode as to the color change in the notification image G may be a display mode with a color change to a more conspicuous color in accordance with the reduction in the arrival time, e.g., a color change from a white color or a cold color to a warm color.

[2. Detailed Flow of Image Display Processing]

Figure 4:
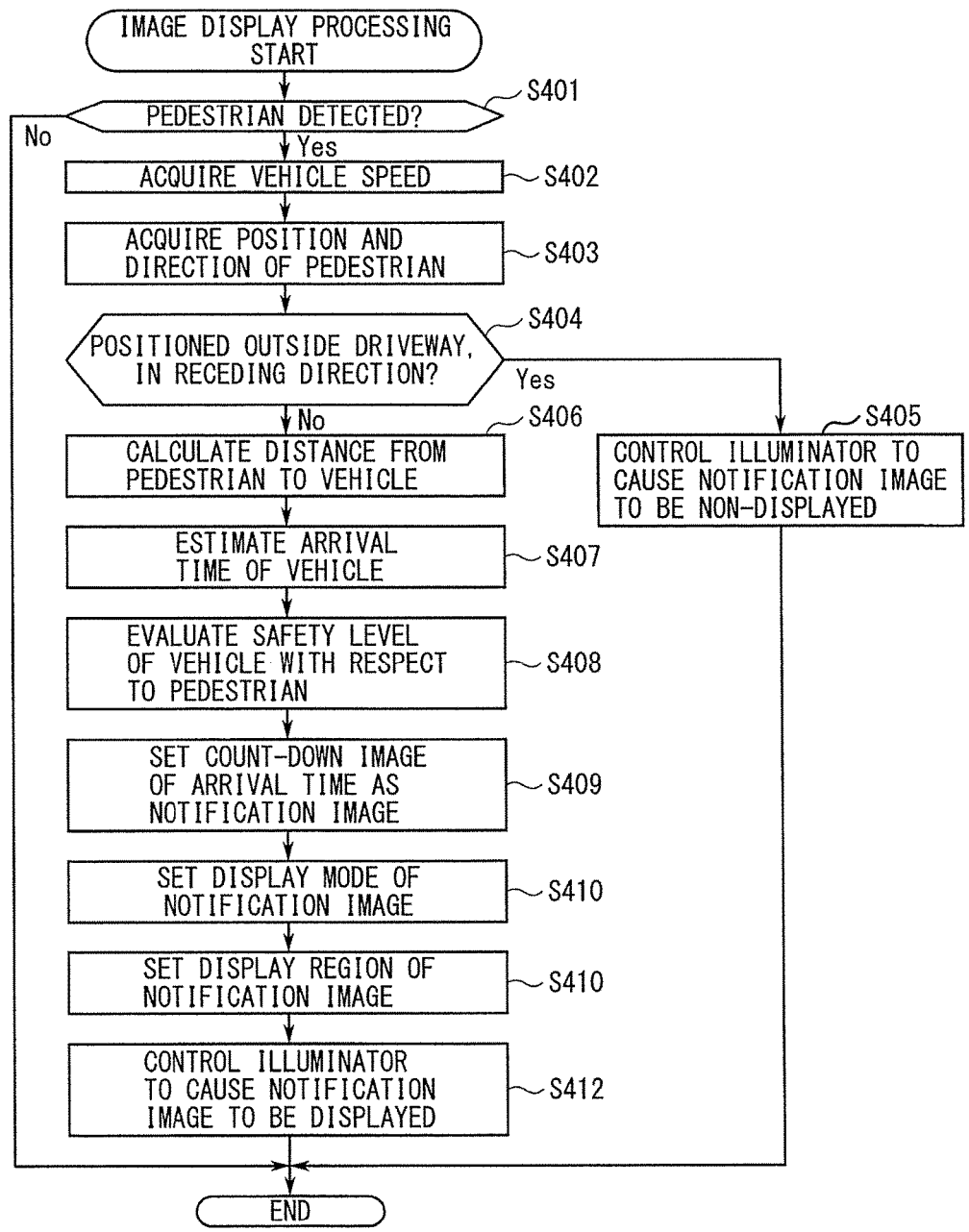
FIG. 4 is a flowchart of a detailed flow of image display processing to be performed in the image display device according to the implementation of the technology.

FIG. 4 is a flowchart of a detailed flow of the image display processing to be performed in the image display device 10 according to the implementation of the technology.

The image display processing illustrated in FIG. 4 may be executed as timer interruption processing performed at predetermined cycles.

In step S401, the controller 50 may determine whether or not the pedestrian W has been detected by the detector 30. In one specific but non-limiting example, the controller 50 may determine whether or not an image of the pedestrian W is included in the images acquired by the detector 30, to determine whether or not the pedestrian W has been detected by the detector 30. In a case where the pedestrian W has not been detected by the detector 30, the controller 50 may end the processing. In a case where the pedestrian W has been detected by the detector 30, the flow may proceed to step S402.

In step S402, the controller 50 may acquire the speed of the vehicle 1 measured.

In step S403, the controller 50 may acquire the pedestrian position and the pedestrian direction of the pedestrian W detected by the detector 30.

In step S404, the controller 50 may determine whether or not the pedestrian position falls outside the driveway, and whether or not the pedestrian direction is the receding direction from the vehicle 1 or the driveway. In a case where the pedestrian position does not fall outside the driveway, or in a case where the pedestrian direction is not the receding direction from the vehicle 1 or the driveway, the flow may proceed to step S406. In a case where the pedestrian position falls outside the driveway, and the pedestrian direction is the receding direction from the vehicle 1 or the driveway, the flow may proceed to step S405.

In step S405, the controller 50 may control the illuminator 20 to cause the notification image G to be non-displayed, and end the processing. In the case where the pedestrian position falls outside the driveway, and the pedestrian direction is the receding direction from the vehicle 1 or the driveway, it is assumed that the pedestrian W has no intention of crossing the driveway. In this case, displaying the notification image G on the road surface R may cause erroneous information to be notified to, for example, surrounding vehicles or surrounding pedestrians. Accordingly, the controller 50 may control the illuminator 20 to cause the notification image G to be non-displayed on the road surface R, in the case where the pedestrian position falls outside the driveway, and the pedestrian direction is the receding direction from the vehicle 1 or the driveway.

In step S406, the controller 50 may calculate the distance from the pedestrian position detected by the detector 30 to the vehicle 1.

In step S407, the controller 50 may estimate the arrival time it takes for the vehicle 1 to arrive at the pedestrian position, on the basis of the distance from the pedestrian position detected by the detector 30 to the vehicle 1, and on the basis of the speed of the vehicle 1.

In step S408, the controller 50 may evaluate the safety level of the vehicle 1 with respect to the pedestrian W, on the basis of the arrival time estimated, and on the basis of the pedestrian position and the pedestrian direction detected by the detector 30. For example, the controller 50 may evaluate the safety level of the vehicle 1 with respect to the pedestrian W, according to the evaluation items summarized in FIG. 3.

In step S409, the controller 50 may set the count-down image of the arrival time, as the notification image G.

In step S410, the controller 50 may set the display mode of the notification image G thus set, in accordance with the safety level evaluated.

In step S411, the controller 50 may set a display region of the notification image G, to cause the notification image G to be on the movable display following the change in the pedestrian position and the change in the pedestrian direction detected by the detector 30. When the pedestrian position detected by the detector 30 changes, the region of the road surface R spaced away from the pedestrian position by a predetermined distance may also change following the change in the pedestrian position. When the pedestrian direction detected by the detector 30 changes, the region of the road surface R located ahead in the pedestrian direction may also change following the change in the pedestrian direction. The controller 50 may set, as the display region of the notification image G, the region of the road surface R that is spaced away from the pedestrian position detected by the detector 30 by the predetermined distance and is located ahead in the pedestrian direction detected by the detector 30. Thus, the notification image G may be on the movable display following the change in the pedestrian position and the change in the pedestrian direction detected by the detector 30.

In step S412, the controller 50 may control the illuminator 20, to cause the notification image G to be displayed on the road surface R, as the set image, in the set display mode, and in the set display region. Thereafter, the controller 50 may end the processing.

[3. Notification Image to be Displayed by Image Display Processing]

Figure 5A:
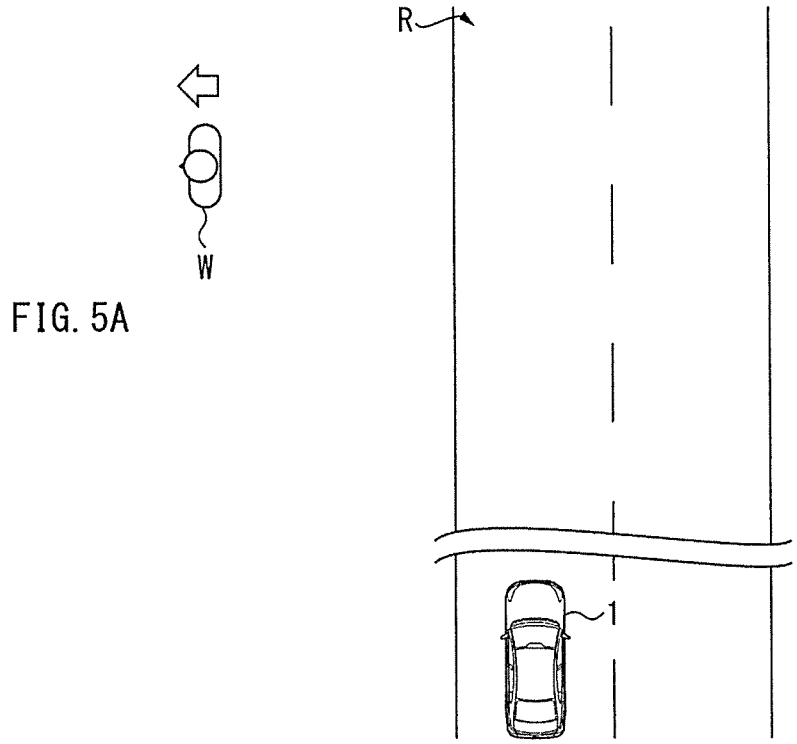
FIG. 5A illustrates a notification image to be displayed by the image display device according to the implementation of the technology.
Figure 5B:
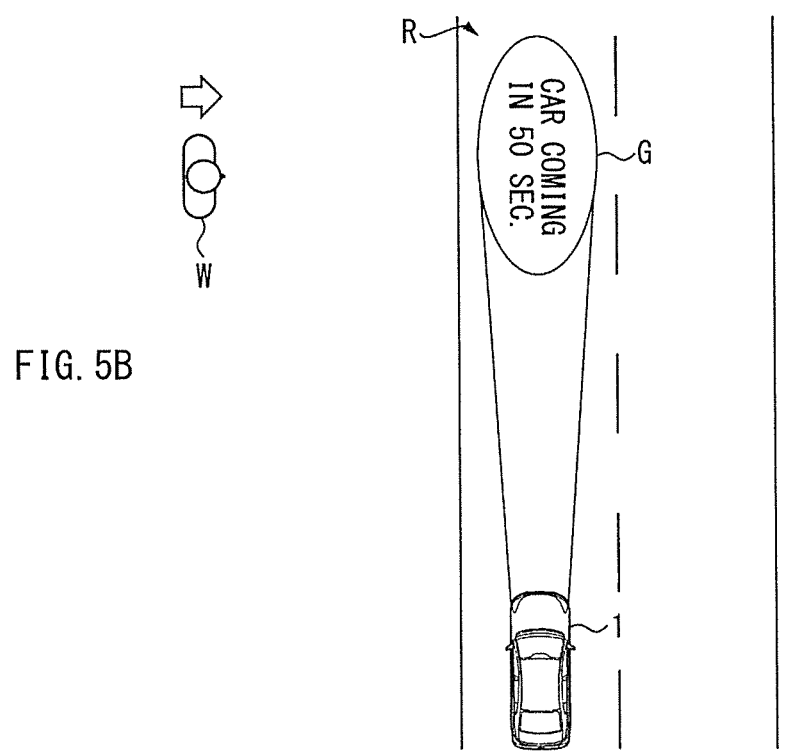
FIG. 5B illustrates the notification image to be displayed by the image display device according to the implementation of the technology, in a chronologically-changed state from the notification image illustrated in FIG. 5A.
Figure 6A:
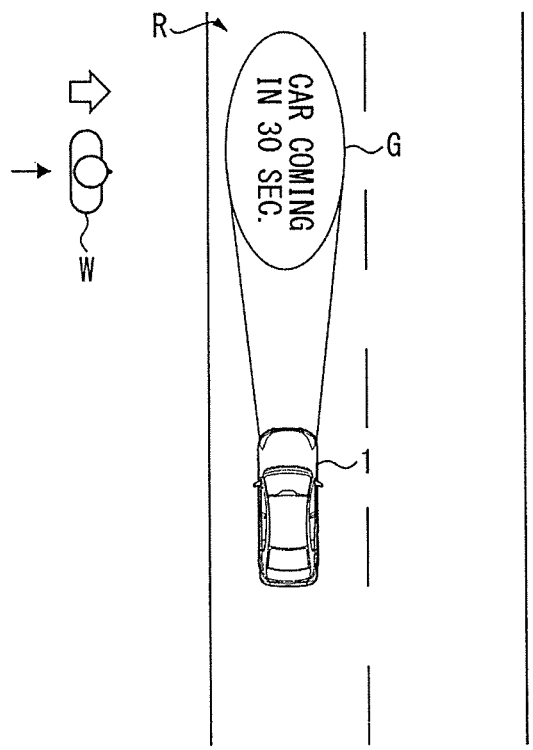
FIG. 6A illustrates the notification image to be displayed by the image display device according to the implementation of the technology, in a chronologically-changed state from the notification image illustrated in FIG. 5B.
Figure 6B:
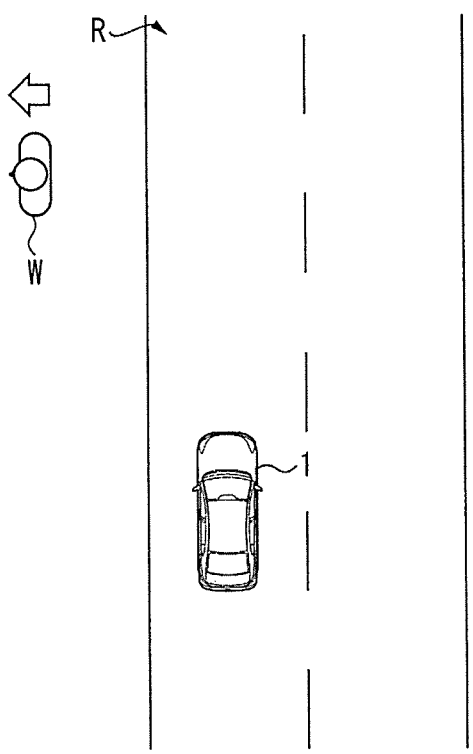
FIG. 6B illustrates the notification image to be displayed by the image display device according to the implementation of the technology, in a chronologically-changed state from the notification image illustrated in FIG. 6A.
Figure 7A:
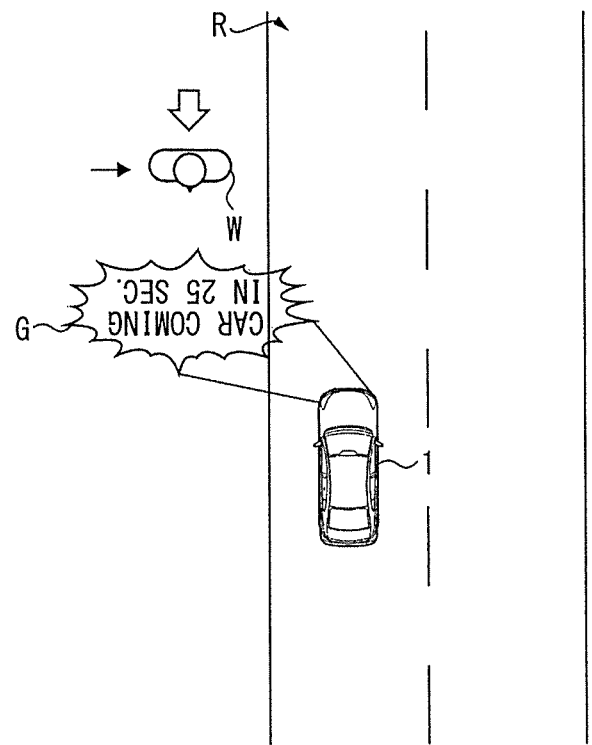
FIG. 7A illustrates the notification image to be displayed by the image display device according to the implementation of the technology, in a chronologically-changed state from the notification image illustrated in FIG. 6B.
Figure 7B:
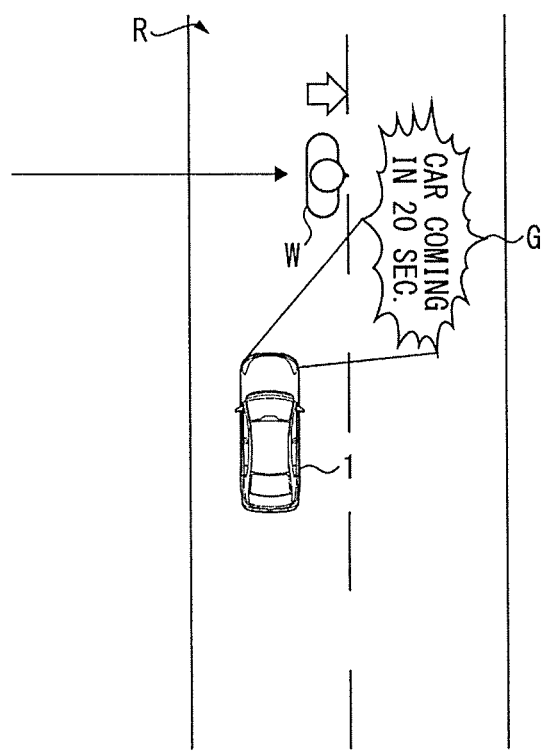
FIG. 7B illustrates the notification image to be displayed by the image display device according to the implementation of the technology, in a chronologically-changed state from the notification image illustrated in FIG. 7A.

FIGS. 5A to 7B illustrate the notification image G to be displayed by the image display device 10 according to the implementation of the technology. FIG. 5A illustrates a state before the notification image G is displayed. FIG. 5B illustrates a state immediately after the notification image G is displayed. FIG. 6A illustrates a chronologically-changed state from the notification image G illustrated in FIG. 5B. FIG. 6B illustrates a chronologically-changed state from the notification image G illustrated in FIG. 6A. FIG. 7A illustrates a chronologically-changed state from the notification image G illustrated in FIG. 6B. FIG. 7B illustrates a chronologically-changed state from the notification image G illustrated in FIG. 7A.

In FIGS. 5A to 7B, the change in the pedestrian position is denoted by a black arrow. The pedestrian direction is denoted by an outlined arrow.

Before the notification image G is displayed, as illustrated in FIG. 5A, let us assume that the pedestrian position falls outside the driveway, and the pedestrian direction is the receding direction from the driveway. Thereafter, when the pedestrian direction changes to the approaching direction with respect to the driveway, the image display device 10 may display, as illustrated in FIG. 5B, the count-down image of the arrival time on the road surface R, as the notification image G. FIG. 5B illustrates, for example, a state in which an image that indicates that the vehicle 1 arrives at the pedestrian position in 50 seconds is displayed in a confronted direction with the pedestrian direction.

Thereafter, as the vehicle 1 travels, the distance from the pedestrian position to the vehicle 1 becomes shorter. In accordance therewith, the image display device 10 may display, as illustrated in FIG. 6A, the count-down image of the arrival time, with seconds being counted backwards. FIG. 6A illustrates, for example, a state in which an image that indicates that the vehicle 1 arrives at the pedestrian position in 30 seconds is displayed in the confronted direction with the pedestrian direction.

Thereafter, when the pedestrian direction changes to the receding direction from the driveway, the image display device 10 may control the illuminator 20 to cause the notification image G to be non-displayed, as illustrated in FIG. 6B. Thus, the image display device 10 may stop displaying the count-down image of the arrival time. FIG. 6B illustrates, for example, a state in which display of the image that indicates that the vehicle 1 arrives at the pedestrian position in 30 seconds is stopped.

Thereafter, when the pedestrian position changes to a position close to the driveway, and the pedestrian direction changes to the approaching direction with respect to the vehicle 1, the image display device 10 may display, as illustrated in FIG. 7A, the count-down image of the arrival time, with seconds being counted backwards. The count-down image of the arrival time may be displayed in a region corresponding to the change in the pedestrian position and the change in the pedestrian direction. At this occasion, because the safety level has lowered, the image display device 10 may provide the highlighted display of the count-down image of the arrival time, with seconds being counted backwards, in order to attract the attention of the pedestrian W more easily. FIG. 7A illustrates, for example, a state in which an image that indicates the vehicle 1 arrives at the pedestrian position in 25 seconds is on the highlighted display in the confronted direction with the pedestrian direction, and is on the movable display following the change in the pedestrian position and the change in the pedestrian direction.

Thereafter, when the pedestrian W crosses, causing the change in the pedestrian position to inside the driveway, and causing the change in the pedestrian direction to the approaching direction with respect to a centerline of the driveway, the image display device 10 may display, as illustrated in FIG. 7B, the count-down image of the arrival time, with seconds being counted backwards. The count-down image of the arrival time may be displayed in the region corresponding to the change in the pedestrian position and the change in the pedestrian direction. FIG. 7B illustrates, for example, a state in which an image that indicates the vehicle 1 arrives at the pedestrian position in 20 seconds is on the highlighted display in the confronted direction with the pedestrian direction, and is on the movable display following the change in the pedestrian position and the change in the pedestrian direction.

[4. Workings and Effects]

As described, in the image display device 10 according to this implementation, the notification image G to be notified to the pedestrian W may be on the chronologically-changeable display on the road surface R in accordance with the change in the safety level of the vehicle 1 with respect to the pedestrian W. Accordingly, in the image display device 10 according to this implementation, it is possible for the pedestrian W to recognize what degree of allowance for safety they have at this moment in time. Hence, in the image display device 10 according to this implementation, it is possible to notify the pedestrian W of the safety level of the vehicle 1, leading to suppression of occurrence of a traffic accident such as collision of the pedestrian W with the vehicle 1.

Meanwhile, for example, the technique as described in JP-A 2009-149152 makes it possible for a driver of a vehicle to know predetermined information without a considerable movement of a line of sight. However, a pedestrian is not able to quantitatively recognize the safety level of the vehicle with respect to the pedestrian. Therefore, the technique as described in JP-A 2009-149152 causes the pedestrian difficulty in determining, in real time, what degree of allowance for safety they have. In contrast, in the image display device 10 according to this implementation, it is possible to notify the pedestrian W of the safety level of the vehicle 1. This makes it possible for the pedestrian W to determine safety in real time, resulting in the suppression of the occurrence of the traffic accident such as the collision of the pedestrian W with the vehicle 1.

Moreover, in the image display device 10 according to this implementation, the arrival time it takes for the vehicle 1 to arrive at the pedestrian position detected by the detector 30 may be evaluated as the safety level. The count-down image of the arrival time may be displayed as the notification image G. Accordingly, in the image display device 10 according to this implementation, it is possible for the pedestrian W to quantitatively recognize, in real time, a chronological change in the safety level. Hence, in the image display device 10 according to this implementation, it is possible to notify the pedestrian W of the safety level more accurately, leading to further suppression of the occurrence of the traffic accident.

Furthermore, in the image display device 10 according to this implementation, the safety level may be evaluated on the basis of the pedestrian position and the pedestrian direction detected by the detector 30. Even in the case with the change in the pedestrian position and the change in the pedestrian direction, the image display device 10 may be able to cause the count-down image of the arrival time to be on the movable display following the change in the pedestrian position and the change in the pedestrian direction. Therefore, in the image display device 10 according to this implementation, it is possible for the pedestrian W to immediately visually recognize the count-down image of the arrival time, and to immediately recognize the safety level. Hence, in the image display device 10 according to this implementation, it is possible to promptly notify the pedestrian W of the safety level, leading to the further suppression of the occurrence of the traffic accident.

In addition, in the image display device 10 according to this implementation, it is possible to display the notification image G, with the display mode, e.g., the size, the luminance, and the color, of the notification image G being changed in accordance with the safety level. Hence, in the image display device 10 according to this implementation, it is possible to easily attract the attention of the pedestrian W in accordance with the safety level, leading to the further suppression of the occurrence of the traffic accident.

Moreover, in the image display device 10 according to this implementation, the notification image G may be non-displayed, in the case where the pedestrian position falls outside the driveway, and the pedestrian direction is the receding direction from the vehicle 1 or the driveway. In other words, in the image display device 10 according to this implementation, it is possible to cause the notification image G to be non-displayed, in the case where it is assumed that the pedestrian W has no intention of crossing the driveway. Therefore, in the image display device 10 according to this implementation, it is possible to suppress the erroneous information from being notified to, for example, the surrounding vehicles or the surrounding pedestrians. Hence, in the image display device 10 according to this implementation, it is possible to accurately notify a target of notification of the notification image G, leading to the further suppression of the occurrence of the traffic accident.

[5. Et Cetera]

In one implementation of the technology, the image display device 10 may serve as an "image display device". In one implementation of the technology, the vehicle 1 may serve as a "vehicle". In one implementation of the technology, the road surface R may serve as a "road surface". In one implementation of the technology, the pedestrian W may serve as a "pedestrian". In one implementation of the technology, the illuminator 20 may serve as an "illuminator". In one implementation of the technology, the detector 30 may serve as a "detector". In one implementation of the technology, the evaluation unit 52 may serve as an "evaluation unit". In one implementation of the technology, the display control unit 55 may serve as a "display control unit". In one implementation of the technology, the evaluation unit 52 and the display control unit 55 may serve as "circuitry".

In one implementation described above, the evaluation unit 52 and the display control unit 55 illustrated in FIG. 2 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the evaluation unit 52 and the display control unit 55. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 2.

It should be appreciated that the forgoing implementations including modification examples may be applied to one another by persons skilled in the art.

The foregoing description is intended to be merely illustrative rather than limiting. It should therefore be appreciated that variations may be made in the implementations of the disclosure by persons skilled in the art without departing from the scope as defined by the appended claims.

The terms used throughout the specification and the appended claims are to be construed as "open-ended" terms. For example, the term "include" and its grammatical variants are intended to be non-limiting, such that recitation of items in a list is not to the exclusion of other like items that can be substituted or added to the listed items. The term "have" and its grammatical variants are intended to be non-limiting, such that recitation of items in a list is not to the exclusion of other like items that can be substituted or added to the listed items.

The invention claimed is:

1. An image display device, comprising:
an illuminator configured to display an image on a road surface of a road frontward of a vehicle traveling on the road; and
a detector configured to detect a pedestrian position and a pedestrian moving direction of a pedestrian who crosses the road frontward of the vehicle;
a controller configured to:
receive, from the detector, the pedestrian position and the pedestrian moving direction: and
cause the illuminator to display a notification image on the road surface based on the pedestrian position and the pedestrian moving direction,
wherein a display position of the notification image on the road surface changes according to a change in the pedestrian position and a change in the pedestrian moving direction,
determine an arrival time for the vehicle to arrive at the pedestrian position based on the pedestrian position and the vehicle speed;
cause the illuminator to display a count-down image of the arrival time as the notification image based on a change in the arrival time;
wherein the notification image notifies information to the pedestrian.

2. The image display device according to claim 1, wherein the controller is configured to:
calculate a distance between the vehicle and the pedestrian based on the pedestrian position;

evaluate a safety level of the vehicle with respect to the pedestrian based on the calculated distance, the pedestrian moving direction, and a speed of the vehicle; and cause the illuminator to display, on the road surface, the notification image a content of which changes in accordance with a change in the safety level evaluated.

3. The image display device according to claim 1, wherein the controller is configured to cause the illuminator to display the notification image in a display mode corresponding to the safety level.

4. The image display device according to claim 3, wherein
the safety level evaluated based on the pedestrian direction being a receding direction from a driveway is higher than the safety level evaluated based on the pedestrian direction being an approaching direction with respect to the driveway,
the safety level evaluated based on the pedestrian direction detected by the detector being a receding direction from the vehicle is higher than the safety level evaluated based the pedestrian direction being an approaching direction with respect to the vehicle, and
the controller causes the illuminator to not display the notification image when 1) the pedestrian position falls outside the road and 2) the pedestrian direction is a receding direction from the road or the vehicle.

5. The image display device according to claim 1, wherein the illuminator includes headlights of the vehicle.

6. The image display device according to claim 2, wherein the illuminator includes headlights of the vehicle.

7. The image display device according to claim 1, wherein the illuminator includes headlights of the vehicle.

8. The image display device according to claim 3, wherein the illuminator includes headlights of the vehicle.

9. The image display device according to claim 4, wherein the illuminator includes headlights of the vehicle.

10. An image display device, comprising:
an illuminator configured to display an image on a road surface of a road frontward of a vehicle traveling on the road, to display an image on the road surface;
a detector configured to detect a pedestrian position and a pedestrian moving direction of a pedestrian who is present frontward of the vehicle; and circuitry configured to:
receive, from the detector, the pedestrian position and the pedestrian moving direction;
cause the illuminator to display a notification image on the road surface so that a display position of the notification image changes according to a change in the pedestrian position and a change in pedestrian moving direction;
determine an arrival time for the vehicle to arrive at the pedestrian position based on the pedestrian position and the vehicle speed;
cause the illuminator to display a count-down image of the arrival time as the notification image based on a change in the arrival time.

11. An image display device, comprising:
an illuminator configured to display an image on a road surface of a road frontward of a vehicle traveling on the road; and
a detector configured to detect a pedestrian position and a pedestrian moving direction of a pedestrian who crosses the road frontward of the vehicle; a controller configured to:
receive, from the detector, the pedestrian position and the pedestrian moving direction;
cause the illuminator to display a notification image on the road surface based on the pedestrian position and the pedestrian moving direction;
calculate a distance between the vehicle and the pedestrian based on the pedestrian position;
evaluate a safety level of the vehicle with respect to the pedestrian based on the calculated distance, the pedestrian moving direction, and a speed of the vehicle;
cause the illuminator to display, on the road surface, the notification image a content of which changes in accordance with a change in the safety level evaluated;
determine an arrival time for the vehicle to arrive at the pedestrian position based on the pedestrian position and the vehicle speed; and
cause the illuminator to display a count-down image of the arrival time as the notification image based on a change in the arrival time,
wherein a display position of the notification image on the road surface changes according to a change in the pedestrian position and a change in the pedestrian moving direction, and
wherein the notification image notifies information to the pedestrian.

* * * * *